Nov. 17, 1931.  C. WILLIAMSON  1,832,341

VALVE

Filed Nov. 16, 1927

Inventor

Clarance Williamson

By Emery, Booth, Janney & Varney his Attorneys

Patented Nov. 17, 1931

1,832,341

UNITED STATES PATENT OFFICE

CLARENCE WILLIAMSON, OF PORT ANGELES, WASHINGTON

VALVE

Application filed November 16, 1927. Serial No. 233,600.

My invention relates to valves for controlling the flow of heavy liquefied stock, such as paper pulp stock, and is particularly adapted for use in the bottom of tanks or vats containing such stock, preferably to be built into the bottom of suck tanks. While the principles of my invention are equally applicable to hand-operated or power-operated valves, the preferred embodiment is more particularly directed to large power-operated valves. My invention aims to provide an improved valve of this character, the objects and advantages of which will appear in the following specification, taken in conjunction with the accompanying drawings, illustrating a preferred form.

Figure 1:
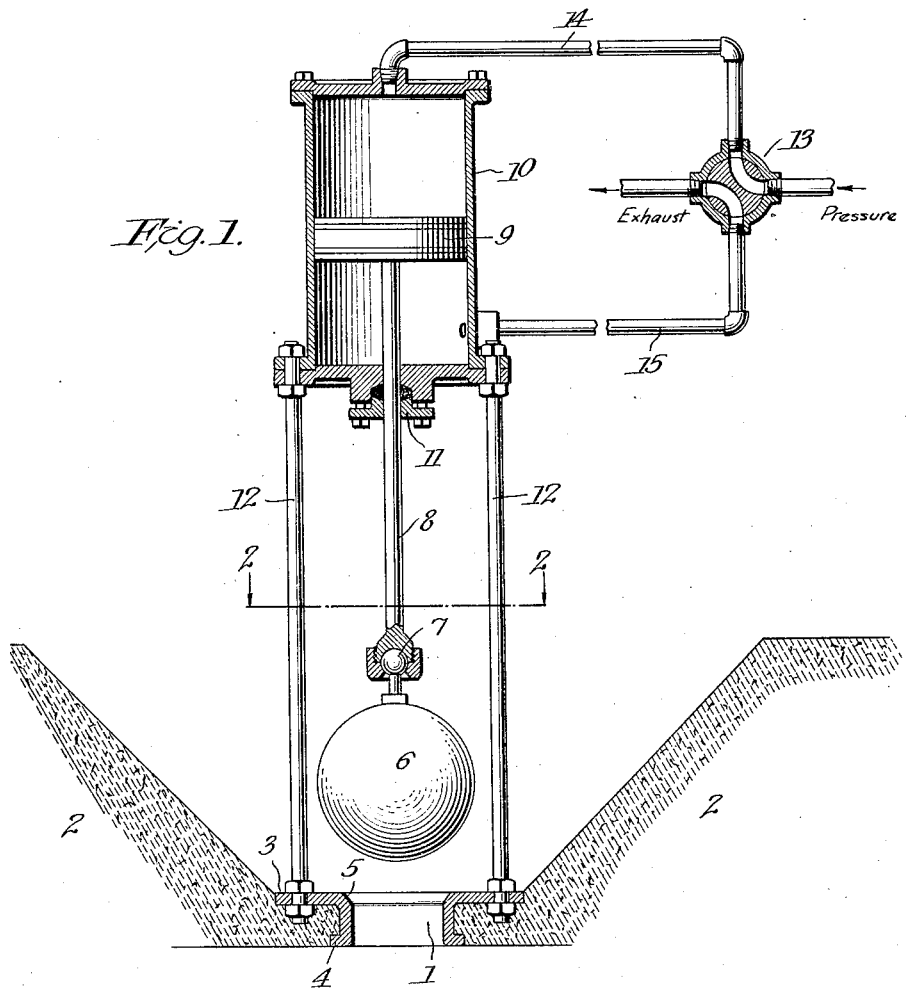
Figure 2:
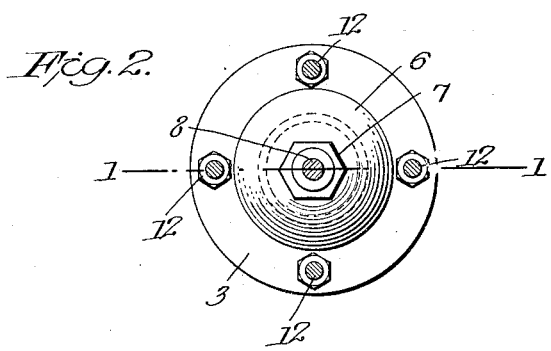

In the drawings accompanying this specification, Fig. 1 is a vertical section on line 1—1, Fig. 2, but showing certain features in elevation, of a power operated valve and operating means embodying my invention in place in a tank; and Fig. 2 is a plan view taken on the line 2—2, Fig. 1, looking downward.

Referring to the drawings, the valve shown therein comprises a ring seat 1 appropriately shaped to be used as an integral part of a stock tank 2, the form herein illustrated being a unitary element, advantageously an iron or steel casting, provided with an enlarged top flange 3 and a small bottom flange 4, and here shown as embedded in concrete; although it will be understood that any suitable seat may be employed. The upper edge of the seat is flared as at 5 to fit a closing member, preferably a ball 6, of such specific gravity as to sink in the contents of the tank, non-rigidly connected, as by a ball-and-socket joint 7, to a rod 8 whereby said ball is lowered or raised. In the preferred form of my invention, said rod is operated by a piston 9, working in a vertical cylinder 10, adapted for operation by compressed air, water, steam, or other suitable fluid pressure power device. It is within the contemplation of my invention that the rod 8 may be operated either by a piston and cylinder, other suitable mechanical means, or even directly by hand. In the preferred form the rod 8 passes through a stuffing box 11 of the usual type in the lower end of the cylinder 10, said stuffing box, as well as the cylinder walls, constituting guiding means for said rod. The cylinder 10 is supported above and aligned with the ring seat at any desired height by means of a suitable framework of such a nature as not to obstruct flow of the heavy stock, nor form pockets in which the stock can collect to obstruct the valve seat or retard the movement of the closing member. Herein four vertical rods or bars 12, supported at their lower ends by the ring seat 1, are shown as constituting such a support.

Where power operation is resorted to, the controls, of a character appropriate to the nature of the power used, may be located at any desired point. In the present embodiment, a four-way valve 13 connected to the cylinder 10 by means of the pipes 14, 15, is shown as controlling the operation of the valve.

In the operation of this device, pressure being turned on the upper connection 14 of the cylinder 10 forces the rod 8 downward, seating the ball 6 on the flared edge 5 of the seat 1. The ball and socket connection 7 between the ball 6 and the rod 8, permits the ball to seat properly irrespective of bending of the rod 8, or the collection of pulp in the downward path of the ball 6, or side pressure on the ball due to an unequal flow of stock, which would otherwise prevent true seating of the ball and allow leakage.

The use of a closing member free from flat surfaces and with its axis of symmetry centrally disposed with respect to the valve seat and perpendicular to the plane thereof, is advantageous in that the flow of stock about such a closing member, as it approaches its seat, tends to center it with respect to said seat, since the fluid pressure in the direction of the vertical axis is equal on all sides. The non-rigid connection 7 between the closing member 6 and its actuating rod 8 permits the member to respond to the force of gravitation and these centering influences and automatically assume a proper seating position.

A closing member of the above characteristics affords no lodging place for accumulations of stock on or about itself, such as happens with flat types of valves.

Although the connection between the ball 6 and the piston rod 8 is herein shown as a ball-and-socket joint 7, any other suitable connection may be employed, of such character that the downward thrust on the rod will be transmitted to the closing member without the necessity of exact alignment between said rod and said closing member. It is also to be understood that while I have selected a globular closing member as the preferred type I do not limit myself thereto, but may employ a closing means of any form which is operable in accordance with the principles of this invention. For example, an ovoid or a pear-shaped member might be advantageously employed under certain circumstances.

It will be apparent from the foregoing that I have invented a valve particularly designed for control of horizontal openings in situations where a large and heavy size is necessary, where the character of the flowing material is such that a limited freedom of motion must be allowed the closing member, and where submerged guideways for sliding elements are undesirable because of clogging.

It will be understood that I do not limit myself to the exact form of invention herein shown and described but I desire to cover all embodiments of the principles thereof within the scope of the appended claims.

What I claim is:

1. A valve structure particularly adapted to handle thick stock in large vats, comprising, in combination, a seat surrounding an opening, a flange extending outward from said seat, an outlet tube below said seat, a second outward flange on the bottom of said tube, said first-named flange being adapted to form part of the bottom surface of a vat, said second-named flange being adapted to be embedded in the floor of a vat, a plurality of widely-separated upright rods rising from said first-named flange and forming a cage, a closure element adapted to be moved within said cage and to be loosely guided thereby, and operating means for said valve supported by said rods.

2. A valve structure particularly adapted to handle thick stock in large vats, comprising, in combination, a seat element consisting of a short tube with upper and lower outside flanges and a seat face upon its upper end, said flanges being adapted to hold said seat element embedded in the floor structure of a vat, a valve cage comprising a plurality of widely separated upright bars secured to said upper flange, a ball within said cage, said ball being of less diameter than said cage but of greater diameter than the distance between any adjacent bars thereof, power operating means for said valve supported by said cage, an actuating rod connecting said means to said ball, and a loose connection between said rod and said ball.

3. A power operable valve for heavy paper stock, comprising, in combination, bars 12 constituting a guiding cage, a ball 6 mounted within said cage and adapted to be guided thereby, a power operating element for said ball above said cage, an outlet tube of less diameter than said ball at the bottom of said cage and adapted to be closed thereby, an actuating rod 8 connecting said power operating element and said ball, and a movable joint 7 between said ball and said rod adapted to transmit thrust either straight or misaligned to said ball, the combination of said joint and said cage being adapted to constrain said ball to close said tube even when said ball is subjected to unbalanced side forces.

4. An outlet valve for controlling the outflow from a tank of paper pulp stock comprising a beveled valve seat set into the bottom of said tank, valve operating means comprising a thrust rod spaced therefrom and approximately aligned therewith by means providing for substantially unobstructed flow of paper pulp stock, a universally swiveled thrust and pull transmitting connection carried by said thrust rod, and a spherical closing member attached to said connection to be forced onto said seat by advance of said thrust rod, said swiveled thrust transmitting connection providing for deflection of said closing member by pulp stock accumulated on and clogging said seat to enable said closing member to be forced into such position as to most effectively obstruct said clogged seat.

5. A valve for controlling the flow of paper pulp stock comprising a beveled valve seat, valve operating means comprising a thrust rod spaced therefrom and approximately aligned therewith by means providing for substantially unobstructed flow of paper pulp stock, a universally swiveled thrust and pull transmitting connection carried by said thrust rod, and a globular closing member attached to said connection to be forced onto said seat by advance of said thrust rod, said swiveled thrust transmitting connection providing for deflection of said closing member by pulp stock accumulated on and clogging said seat to enable said closing member to be forced into such position as to most effectively obstruct said clogged seat.

6. A valve for controlling the flow of paper pulp stock comprising a beveled valve seat, valve operating means comprising a thrust rod spaced therefrom and approximately aligned therewith by means providing for substantially unobstructed flow of paper pulp stock, a thrust and pull transmitting ball and socket connection carried by said thrust rod, and a globular closing member attached to said connection to be forced onto said seat by advance of said thrust rod, said thrust transmitting connection providing for deflection of said closing member by pulp stock accumulated on and clogging said seat to enable said closing member to be forced into such position as to most effectively obstruct said clogged seat.

7. A power operated valve for controlling the flow of paper pulp stock comprising a beveled valve seat, fluid pressure valve operating means comprising a piston rod spaced therefrom and approximately aligned therewith by means providing for substantially unobstructed flow of paper pulp stock, a universally swiveled thrust and pull transmitting connection carried by said piston rod, and a globular closing member attached to said connection to be forced onto said seat by operation of said fluid pressure means to advance said piston rod, said swiveled thrust transmitting connection providing for deflection of said closing member by pulp stock accumulated on and clogging said seat to enable said closing member to be forced into such position as to most effectively obstruct said clogged seat.

8. An outlet valve for fluid containing suspended matter comprising in combination, a beveled valve seat defining the inner end of an outlet opening, a globular valve body disposed at the inflow side of said seat, a valve actuating rod supported thereabove for axial movement substantially axially of said seat, and a thrust and pull transmitting ball and socket joint connecting said valve body to said rod to enable the deflection of said valve body by matter deposited on said seat into such position as will best obstruct said matter clogged seat.

In testimony whereof, I have signed my name to this specification.

CLARENCE WILLIAMSON.